United States Patent [19]
Hershey

[11] Patent Number: 5,154,463
[45] Date of Patent: Oct. 13, 1992

[54] GUARD FOR STAKE POCKET AND SIDE RAIL OF FLAT BED TRAILER

[76] Inventor: Russell L. Hershey, 326 N. Main St., Orville, Ohio 44667

[21] Appl. No.: 540,182

[22] Filed: Jun. 19, 1990

[51] Int. Cl.5 .............................................. B60R 19/42
[52] U.S. Cl. ..................................... 293/128; 293/155
[58] Field of Search ............... 293/117, 120, 128, 136, 293/154, 155; 296/36, 43; 267/140

[56] References Cited

U.S. PATENT DOCUMENTS

| | | | |
|---|---|---|---|
| 3,608,882 | 9/1971 | Culp | 267/140 |
| 4,453,761 | 6/1984 | Felburn | 296/43 |
| 4,815,787 | 3/1989 | Hale | 296/167 |
| 5,035,565 | 7/1991 | White | 414/537 |

Primary Examiner—Margaret A. Focarino
Assistant Examiner—Andrew C. Pike
Attorney, Agent, or Firm—Oldham, Oldham & Wilson Co.

[57] ABSTRACT

A guard for protecting the stake pockets and side rails of a flat bed trailer vehicle comprises an elongate member with an essentially L-shaped cross section and at least two protrusions sized, shaped and positioned so as to be slidingly engageable into adjacent stake pockets along the periphery of the flat bed trailer vehicle. In one embodiment of the invention, a rigid angle iron is used as the elongate member; in a second embodiment, an elastomeric material having an arcuate outer surface is used as the elongate member.

3 Claims, 1 Drawing Sheet

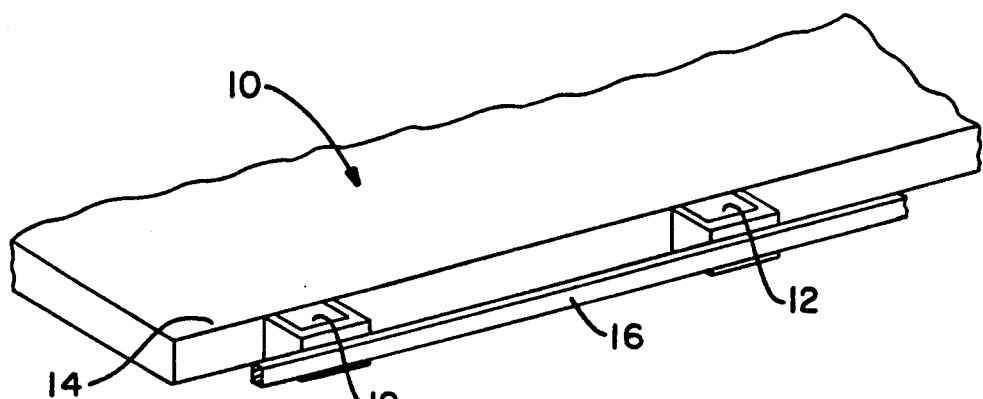
Prior Art   FIG.-1
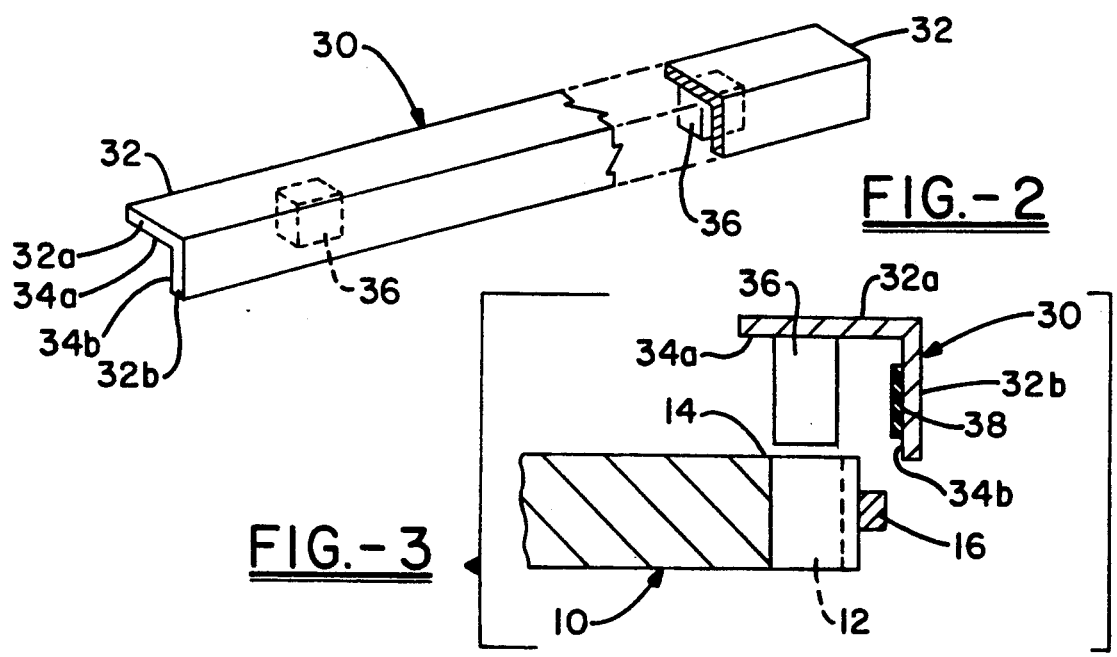
FIG.-2
FIG.-3
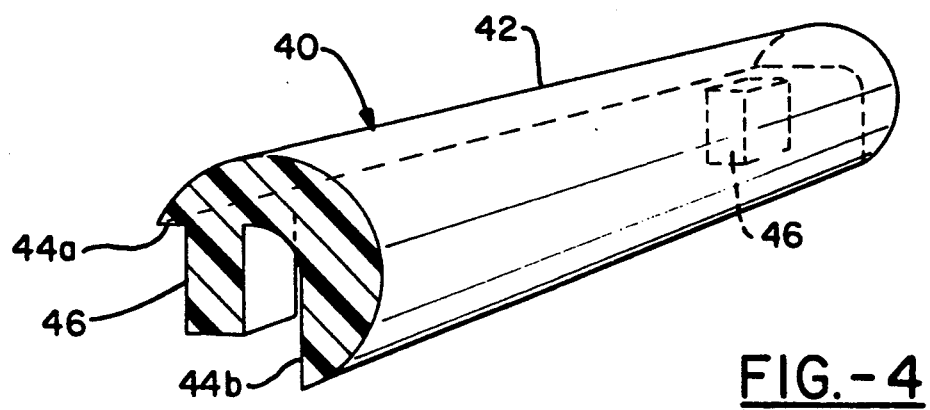
FIG.-4

GUARD FOR STAKE POCKET AND SIDE RAIL OF FLAT BED TRAILER

TECHNICAL FIELD OF THE INVENTION

The present invention relates to a guard for the stake pockets and side rails of a flat bed trailer. Even more specifically, the present invention relates to a guard that engages slidingly into at least one of the stake pockets disposed along the side of a flat bed trailer so as to fill the stake pocket. Even further, the guard has a flap that covers the side rail of the flat bed trailer, thereby protecting the stake pocket and side rail when a tow motor or similar implement is used to unload materials on the flat bed trailer.

BACKGROUND OF THE INVENTION

The flat bed trailer or truck having a plurality of stake pockets along its periphery is well known. For example, U.S. Pat. No. 4,453,761, to Felburn discloses such a trailer in its FIG. 2, where stake pockets are shown as item 11. As noted by Felburn, the common practice is to space such stake pockets two feet apart center to center. These pockets are sized to accept stakes, said stakes being used to hold panels, typically plywood panels in place along the side of the trailer.

A smooth peripheral surface to the trailer is provided by a side rail or rub rail which is welded across the outward side of the stake pockets, typically parallel to the bed of the trailer.

In many trailers today, it is common practice to construct as many components of the trailer of aluminum and other lightweight metals, so as to reduce the weight of the trailer, thereby allowing larger load sizes and better fuel economy. When a relatively soft metal such as aluminum is used, the trailer, the stake pockets, and the side or rub rail are all subject to disfigurement and distortion due to any collision with foreign objects. Particularly, it is common practice to unload such flat bed trailers by removing one or more sections of panels and driving a tow motor or other similar implement upon the bed of the trailer from an adjacent dock. In doing so, it is not unusual for the unloading implement to strike the side of the trailer, the stake pockets, or the rubrail, resulting in damage thereto.

SUMMARY OF THE INVENTION

A first object of the invention is to provide a removable guard that can be inserted into at least one stake pocket along the periphery of the flat bed trailer. It is a second object of the invention to provide a guard for the rubrail of a flat bed trailer.

BRIEF DESCRIPTION OF THE DRAWINGS

FIG. 1 is a perspective view of a trailer or truck bed of prior art;

FIG. 2 is a perspective view of a first embodiment of the present invention;

FIG. 3 is a cross-sectional view taken along line 3—3 in FIGS. 1 and 2 of the operative engagement of the present invention into the flatbed trailer of the prior art; and FIG. 4 is a alternative embodiment of the present invention.

DETAILED DESCRIPTIONS OF THE DRAWINGS

The bed or trailer portion of a flatbed trailer or truck known in the prior art is shown in FIG. 1. Such a trailer bed 10 typically has a plurality of stake pockets 12 disposed along the sides and back of the periphery 14 of the bed 10. Common practice is to space these stake pockets 12 approximately 2 feet apart center to center. A side rail or rub rail 16 is welded across the stake pockets 12, typically parallel to the bed of the trailer. Such a side or rub rail is useful in deflecting collisions with the sides of the stake pockets 12, thereby preventing damage to the stake pockets 12. Further, the side rail or rub rail 16 is useful in providing the side of the trailer bed 10 with a smooth surface in the event of collisions while the trailer is being pulled by a tractor.

In the practice of unloading the flatbed trailer 10, it is common to drive a tow-lift truck or other similar device onto the trailer 10 from the back or from the sides of the trailer. In such a situation, it is easy to strike or damage the stake pockets 12, the periphery 14 of the truck bed 10, or the rubrail 16, all of which are exposed when the stakes (not shown) that typically fill the stake pockets 12 and provide side paneling for the flat bed trailer 10 are in position.

The guard 30 of the present invention is disclosed in a first embodiment in FIG. 2. The guard 30 has a elongate member 32 having a roughly L-shaped cross section that is sized and adapted to extend between at least two adjacent stake pockets 12 and over both the periphery 14 of the trailer bed 10 and the rub rail 16 so that, in operative engagement with the trailer bed 10, the guard 30 will cover and thereby protect the stake pockets 12, the periphery 14 of the trailer bed 10, and rub rail 16. Elongate member 32, due to its L-shaped cross section, has a first position 32a which is essentially positioned horizontally, that is, parallel to the bed of the trailer or normal to the stake pockets, and a second portion 32b which is positioned essentially perpendicularly to first portion 32a. The inner surfaces 34 of the elongate portion 32 of guard 30, that is, the surfaces disposed at approximately 90° to each other, have at least one means of fastening the guard 30 onto the trailer bed 10 disposed on at least one of them. The two inner surfaces 34 are indicated as 34a and 34b on FIG. 2, surface 34a being the surface positioned essentially horizontally, that is, upon the top of stake pockets 12, and surface 34b being the surface essentially perpendicular to surface 34a.

In the particular embodiment shown in the FIG. 2, this means for fastening is disclosed as a pair of protrusions 36 sized and spaced to correspond to an adjoining pair of stake pockets 12. These protrusions are affixed to inner surface 34a. Certainly a longer version of the guard 30 could have more than two such protrusions 36, each such protrusion 36 positioned relatively to each other so that each may be slidingly engaged into a corresponding stake pocket 12. Similarly, it would be possible to design a guard 30 with a centrally positioned protrusion 36 for slidingly engaging a stake pocket 12 and, thereby, providing coverage of a that stake pocket 12, and the adjacent periphery 14 of the trailer bed and rub rail 16. However, the inventor clearly believes that a construction involving at least two protrusions 36 slidingly engaging the corresponding stake pockets 12 is preferred. Likewise, the exact cross-sectional shape and size of each protrusion 36 is subject to the design preference of the manufacturer, so long as the protrusion 36 may be slidingly engaged, preferably in a relatively secure or snug manner, into the corresponding stake pocket 12. The clear preference is a protrusion that emulates the size and shape of the stake normally used in the stake pocket 12.

The material of construction of the guard 30 and particularly the elongate member 32 can be varied by one of skill in this art, but the preferable material is a relatively rigid metal, such as steel, particularly angle stock. It is noted that quite often the flatbed trailer 10, the stake pockets 12, and the rubrail 14 are comprised of aluminum or other relatively deformable metal. It is this relative ease of deformation that is sought to be prevented by the guard 30 of the present invention.

Turning now to FIG. 3, the method of engaging guard 30 with the side rail combination known in the prior art is illustrated. An additional feature shown in FIG. 3 is a thin strip 38 of an elastomeric material, such as a material not dissimilar from that used in the construction of tires. This elastomeric strip 38, disposed longitudinally along surface 34b, is used to further cushion the void space or clearance that will exist between the downwardly extending arm 32b of the L-shaped member and the rub rail 16 to which it will be closely juxtaposed.

A second embodiment 40 of the present invention is presented in FIG. 4. In this case, a relatively elastomeric material formed into elongate member 42 has been substituted for the metallic elongate member 32 shown in FIGS. 2 and 3. As a result, the capability of producing the piece by known molding techniques for elastomers permits a more generalized "bumper-like" structure to be achieved than the "angle iron" type structure shown in FIGS. 2 and 3. Because of this change, a more arcuate outer surface is presented to the oncoming tow-lift motor or the like, so that the forks or other parts of the tow-lift motor will, instead of striking the guard 40 and continuing to "drive through" it, be deflected upwardly and away from the flatbed itself. The inner surfaces 44a and 44b are disposed essentially perpendicularly to each other analogously to inner surfaces 34a and 34b in FIG. 2. Again, molding techniques may tend to "round off" the hard edges, but the overall concept is to provide essentially perpendicular surfaces.

The second embodiment 40 of FIG. 4 utilizes means for fastening analogous to that disclosed in the first embodiment 30 of FIG. 2. In the particular embodiment shown in the FIG. 3, this means for fastening is disclosed as a pair of protrusions 46 sized and spaced to correspond to an adjoining pair of stake pockets 12. These protrusions are affixed to inner surface 44a. Certainly a longer version of the second embodiment 40 could have more than two such protrusions 46, each such protrusion 46 positioned relatively to each other so that each may be slidingly engaged into a corresponding stake pocket 12. Similarly, it would be possible to design a guard having second embodiment 40 with a centrally positioned protrusion 46 for slidingly engaging a stake pocket 12 and, thereby, providing coverage of a that stake pocket 12, and the adjacent periphery 14 of the trailer bed, and rub rail 16. However, the inventor clearly believes that a construction involving at least two protrusions 46 slidingly engaging the corresponding stake pockets 12 is preferred. Likewise, the exact cross-sectional shape and size of each protrusion 46 is subject to the design preference of the manufacturer, so long as the protrusion 46 may be slidingly engaged, preferably in a relatively secure or snug manner, into the corresponding stake pocket 12. The clear preference is a protrusion 46 that emulates the size and shape of the stake normally used in the stake pocket 12.

It is also noted that no equivalent of elastomeric strip 38 of FIG. 2 is used in this second embodiment 40 of FIG. 4, the function provided by strip 38 being subsumed by the elongate member 42 itself.

Although not specifically illustrated in the drawings presented herewith, it may be desirable to stiffen or reinforce the longitudinal dimension of elongate member 42 of the second embodiment 40 with a metallic bar or other reinforcing material having the elastomeric material molded upon it or laid down upon it.

The method of operative engagement of second embodiment 40 with the relevant structures of the trailer bed 10 is exactly analogous to that disclosed in FIG. 3.

While in accordance with the patent statutes a preferred embodiment and best mode have been presented, the scope of the invention is not limited thereto, but is to be measured by the scope of the attached claims.

What is claimed is:

1. A guard for stake pockets and side rails of a flat bed trailer vehicle having such stake pockets, side rails, or both, said guard comprising:

a rigid metallic elongate member having an essentially "L" shape cross-sectional configuration, said member having first and second inner surfaces and an outer surface, said first and second inner surfaces being on a concave side of the "L" shape configuration and being essentially perpendicular to each other, and said outer surface being on a convex side of the "L" shape configuration;

at least one protrusion disposed on one of said inner surfaces, each said protrusion sized, shaped, and positioned so as to be slidingly engageable into a corresponding said stake pocket on said vehicle; and the elongate member further having a strip of elastomeric material disposed on said second inner surface so as to cushion the juxtaposition of said second inner surface with the side rail of said flat bed trailer vehicle.

2. A guard according to claim 1 wherein the first inner surface is of sufficient width to fully cover the stake pockets of the vehicle, and the second inner surface is sufficiently wide to overlap the side rail of the vehicle.

3. A guard for stake pockets and side rails of a flat bed trailer vehicle having such take pockets, side rails, or both, said guard comprising:

an elastomeric elongate member having an essentially "L" shape cross-sectional configuration, said member having first and second inner surfaces and an outer surface, said first and second inner surfaces being on a concave side of the "L" shape configuration and being essentially perpendicular to each other, and said outer surface being on a convex side of the "L" shape configuration; and at least one protrusion disposed on one of said inner surfaces each said protrusion sized, shaped, and positioned so as to be slidingly engageable into a corresponding said stake pocket on said vehicle.

* * * * *